(12) United States Patent
Li (10) Patent No.: US 10,400,965 B1
(45) Date of Patent: *Sep. 3, 2019

(54) LIGHTING APPARATUS (71) Applicant: LEEDARSON AMERICA INC., Smyrna, GA (US)

(72) Inventor: Yongchuan Li, Smyrna, GA (US)

(73) Assignee: LEEDARSON AMERICA INC., Smyrna, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,138

(22) Filed: Mar. 28, 2019

Related U.S. Application Data (63) Continuation of application No. 15/940,953, filed on Mar. 29, 2018.

(51) Int. Cl.
| | |
|---|---|
| *F21S 8/00* | (2006.01) |
| *F21S 8/02* | (2006.01) |
| *F21V 23/06* | (2006.01) |
| *F21V 8/00* | (2006.01) |
| *F21V 29/70* | (2015.01) |
| *F21V 23/00* | (2015.01) |
| *F21V 15/01* | (2006.01) |
| *F21Y 115/10* | (2016.01) |

(52) U.S. Cl.
CPC ............. *F21S 8/026* (2013.01); *F21V 15/01* (2013.01); *F21V 23/008* (2013.01); *F21V 23/06* (2013.01); *F21V 29/70* (2015.01); *G02B 6/0073* (2013.01); *F21Y 2115/10* (2016.08)

(58) Field of Classification Search
CPC .......... F21S 8/026; F21V 29/70; F21V 15/01; F21V 23/008; F21V 23/06
See application file for complete search history.

(56) References Cited

U.S. PATENT DOCUMENTS

| | | | |
|---|---|---|---|
| 2008/0106907 A1* | 5/2008 | Trott ...................... | F21S 8/026 362/368 |
| 2008/0130298 A1* | 6/2008 | Negley ................... | F21S 8/026 362/365 |
| 2013/0271976 A1* | 10/2013 | Huang ................ | F21V 19/0055 362/235 |
| 2015/0362169 A1* | 12/2015 | Hodrinsky .............. | F21V 29/74 315/112 |
| 2016/0091191 A1* | 3/2016 | Matsuda ............... | F21V 19/004 362/382 |
| 2017/0363261 A1* | 12/2017 | White ..................... | F21S 8/026 |
| 2018/0112857 A1* | 4/2018 | Wronski ................ | F21V 21/096 |
| 2018/0216805 A1* | 8/2018 | Gantenbrink ........... | F21V 17/02 |
| 2018/0259165 A1* | 9/2018 | Hou ....................... | F21V 17/108 |

* cited by examiner

*Primary Examiner* — Gerald J Sufleta, II
(74) *Attorney, Agent, or Firm* — Chun-Ming Shih (57) ABSTRACT

An assembly light apparatus has a LED module, a light box, a driver box. The driver box is installed in a cavity of a ceiling via a fixing structure. The light box contains the LED module. The light box has a output opening and a back cover. The back cover has a first electrical terminal and a second electrical terminal connected to a first electrode and a second electrode of the driver box respectively. The light box and the driver box are detachably connected with a light box connector and a driver box connector.

16 Claims, 9 Drawing Sheets

LIGHTING APPARATUS

RELATED APPLICATION

The present application is a continued application of U.S. patent application Ser. No. 15/940,953 filed on Mar. 29, 2018.

FIELD OF INVENTION

The present invention is related to a light apparatus and more particularly related to an assembly light apparatus.

BACKGROUND

There are various light devices in daily life. In modern society, light devices are an important symbol as well as tools to support today's civilization growing.

Some light devices are fixed in the ceiling like downlight devices. Some are placed on table, and some other light devices are used for various working needs. For example, a photographer needs various light devices to create a desired luminous environment. Some light devices need to be portable to be conveniently moved and placed in working environments.

Innovative light devices might not appear important as they are. But it is helpful to enhance human life when various novel light devices are invented and provided to the world. Such innovation may be on decreasing manufacturing cost, adding features, or making light devices more portable or with more functions.

Therefore, it is beneficial to continue find out innovative light designs in such crowded art. Any innovation advancement may bring certain advancement of this society, by finding new design, new technical problems and new technical solutions to bring new products.

SUMMARY OF INVENTION

According to an embodiment of the present invention, an assembly light apparatus is designed to be installed in a cavity of a ceiling.

The assembly light apparatus has a LED module, a light box, a driver box, a first electrode, a second electrode, a light box connector, a driver box connector and a fixing structure.

The light box has a containing space for disposing the LED module. The light box has a back cover and a output opening. For example, the light box may be a three-dimension disk shape structure with a sidewall with a side covered by the back cover and the other side has an output opening covered by a transparent or translucent cover. In another example, the light box may have a polygonal shape.

The LED module emits a light that is directly or indirectly escaped outside the assembly light apparatus. For example, the LED module may be placed facing to the output opening. In such case, one or several optical means like reflector, lens or diffusion layer may be placed along light output path. In another example, the LED module is placed at side wall of the light box and a light guide is used for directing light to another angle for outputting form the output opening.

The back cover has a first electrical terminal and a second electrical terminal. For example, the first electrical terminal and the second electrical terminal may be protruding pins or concave sockets on the back cover of the light box.

The driver box contains a driver circuit for converting an external power source to a driving current, e.g. 110-220V alternating current to a direct low-voltage current.

The first electrode and the second electrode are electrically connected to the driver circuit.

The light box connector is fixed on the light box. The driver box connector is fixed on the driver box. The light box connector and the driver box connector have corresponding structures to be detachably connected to each other. When the light box connector and the driver box connector are connected, the light box is fixed to the driver box to keep the first electrical terminal and the second electrical terminal to contact with the first electrode and the second electrode for routing the driving current to the first electrical terminal and the second electrical terminal to drive the LED module to emit the light.

The fixing structure is fixed on the driver box for attaching the driver box to the cavity of the ceiling. In other words, the driver box may be firstly fixed on a ceiling with the fixing structure, e.g. two springs, elastic clips, corresponding to different light fixture standards, e.g. to be installed in an UL box in north America.

In some embodiments, the driver box connector includes a L shape hook. The light box connector includes a groove track. The attachment between the driver box and the light box is performed by sliding the L shape hook into the groove track.

In some embodiments, the assembly light apparatus further includes a stop lock for further locking the L shape hook in a specific position of the groove track. Specifically, an extra force is necessary to move the L shape hook away from the specific position of the groove track. There are various ways to implement such stop lock. For example, an elastic curve groove may be used for holding an end of the L shape hook at the specific position.

In some embodiments, the driver box has a circular protruding structure corresponding to an inner wall of a circular electrode module on the back cover of the light box to align the driver box with respect to the light box.

Specifically, the light box has the circular electrode module with an inner wall facing upwardly and the driver box has the corresponding circular protruding structure facing downwardly. When installed correctly, the circular protruding structure enters and fits in the containing space defined by the inner wall of the circular electrode module.

Please be noted that the circular protruding structure may be disposed on the light box while the circular electrode module is disposed on the driver box as an alternative embodiment.

In some embodiments, furthermore, the first electrode and the second electrode are two metal clips disposed at a relative distance from the circular protruding structure. The circular electrode module has an outer ring and an inner ring. When the circular protruding structure is embedded inside the inner wall of the circular electrode module, the first electrode and the second electrode respectively electrically contact with the first electrical terminal located at an inner surface of the outer ring and an outer surface of the inner ring.

In some embodiments, the outer ring and the inner ring of the circular electrode module are made of plastic material attached with the first electrical terminal and the second electrical terminal respectively. In other words, the outer ring, the inner ring and even the major part of the housing of the light box may be made of insulated material like plastic, which may be less expensive and save certain manufacturing cost.

In some embodiments, the outer ring and the inner ring have fastener structures to fix the first electrical terminal and the second electrical terminal. For example, certain elastic hooks may be placed at top of the outer ring and the inner ring to keep to the first electrical terminal and the second electrical terminal attaching to their side walls.

In some embodiments, the back cover of the light box includes metal material. The back cover is heat conductively connected with the driver box for enhancing heat dissipation. In other words, heat generated from the LED module may be transmitted to the housing of the driver box for enhancing heat dissipation. In some other case where the driver box generates more heat, the heat of the driver box may be delivered to the back cover of the light box, which may be regarded as a heat sink.

In some embodiments, the back cover of the light box is closely attached to the surface of the driver box. In some other embodiments, certain air channels are specifically remained between the driver box and the light box to keep one heat source to interfere with components in another heat source.

In some embodiments, heat is firstly transmitted from the light box to the driver box and then further transmitted to another structure like an UL box via the fixing structure.

In some embodiments, the light box includes a panel light module. Unlike traditional panel light, which has a small thickness light panel attaching on a ceiling facing down, the light box is detachable from the driver box.

The LED module may include multiple LED chips emitting light into a light guide from a lateral wall of the light box and the light guide guides the light from the output opening. The light guide may be made of a plastic plate disposed with multiple light paths and light decoupling grooves, convex or concave structures for light to escape in desired direction and desired pattern.

In some other embodiments, the light box may include a focus lens for converting the light to a light beam at the output opening. For example, the focus lens include one or multiple lens combination. Alternatively, the focus lens may include more than thousands of micro optical lens each respectfully adjusting light paths and form an overall light beam. The term 'light beam' refers to a light output helpful for emphasizing an object projected by the light beam, e.g. with a half-intensity angle of less than 70 degrees or other desired optical effect. Half-intensity angles are standard terms known by persons of ordinary skilled in the art to define optical characteristic, particularly light beam, of a light device.

In some embodiments, since the light box is detachable, another light box with different characteristic may be installed to the same driver box. Specifically, users may buy a assembly light apparatus kit, including multiple light boxes that are replaceable for different purposes.

For example, users may detach a traditional panel light box and attach a colorful holiday light module with the same light box connector to be fixed to a corresponding driver box connector for holiday use. After the holiday, the holiday effect light box, e.g. with colorful filters, may be replaced back to the traditional panel light box.

In some embodiments, the idea may be extended further. Specifically, non-luminance device with the same light box connector as the light box may be designed to replace the light box when necessary by detaching the light box from the driver box and then attaching the non-luminance device to the driver box. For example, a Wi-Fi router, a speaker, a camera, or any other Internet-of-Things devices.

For example, a projector module may be designed to have an interface having the light box connector to be attach to the driver box. The data input of the projector module may be provided wirelessly. The power supply, which may occupy major space, may be now replaced with the driver box. Therefore the projector module may have compact size.

In addition, when the projector module is attached to the driver box, the projector module is located at a perfect position to project images from top to a screen.

In some embodiments, the light box connector is integrated with the first electrical terminal and the second electrical terminal. In other words, both the structural connection and electrical connection are performed by one or two integrated components. For example, electrodes with corresponding wires may be placed on the L-shape structure that is inserted to a corresponding groove track as mentioned above. Corresponding electrodes are also placed on the groove track and when the L-shape structure is placed in the groove track, both structural connection and electrical connection are completed at the same time.

Structures other than L shape structures as mentioned above may be used once they provide both structural and electrical connection between the light box and the driver box.

In some other embodiments, the light box connector is located at a different position from the first electrical terminal and the second electrical terminal. In other words, the structural connection between the light box and the driver box is separate from electrical connection therebetween.

In some embodiments, the first electrode is a L shape chip with a first end for connecting to the first electrical terminal and with a second end for fixing a screw to electrically connect to the driver circuit. For example, the first electrode and the second electrode are two L shape chips with one ends arranged in parallel while the other ends extending to opposite position, e.g. a T shape structure. An insulation material is attached between the two electrodes and two holes are disposed on the other ends of the two electrodes. Metal screws that may be used for establish electricity connection are inserted into the holes and enter into the driver box to contact terminals of the driver circuit, thus routing the driving current from the driver circuit to the first electrode and the second electrode.

In some embodiments, the back cover of the light box and a bottom plate of the driver box is heat conductive connected. For example, the back cover of the light box and a bottom plate of the driver box contact to each other. Heat dissipation glues may even be applied between the light box and the driver box.

In some embodiments, the driver circuit is located on a driver circuit plate away from the bottom plate of the driver box. In other words, the driver circuit is kept a distance not directly close to the light box, to avoid heat accumulation to affect the components of the light box and the driver box.

In some embodiments, a magnetic component may be added for facilitating connection between the light box and the driver box. For example, a magnetic unit and a corresponding unit are placed on the light box and the driver box. When users detach or attach the light box to the driver box, users usually need to stand on a ladder. Magnetic forces may help fix the light box and the driver box more robustly.

Furthermore, the magnetic unit may provide the function of alignment. Users may not need to use their eyes to align the light box with the driver box. The magnetic force helps provide users necessary feedback for users to correctly install the light box to the driver box.

DETAILED DESCRIPTION

Figure 1:
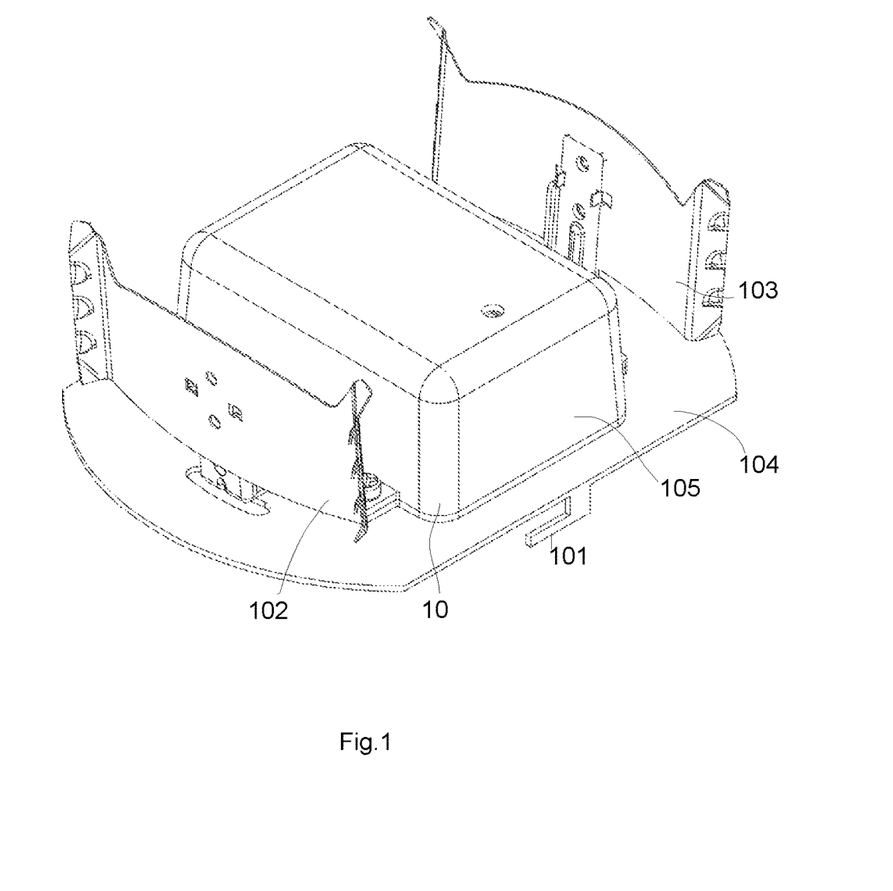
FIG. 1 illustrates a driver box embodiment.

Please refer to FIG. 1. FIG. 1 illustrates a driver box embodiment.

In FIG. 1, the driver box 10 has a bottom plate 104 with a L shape structure 101 as a driver box connector to be attach to a light box explained as follows. The driver box 10 has two elastic clips 102, 103 as a fixing structure to fix to a cavity of a ceiling. In this example, the two elastic clips 102, 103 are used for fixing the driver box 10 to a UL box in America area. For countries or areas with different standards, the fixing structure may be changed to a pair of springs, an installation box, or any other fixing structure to fix the driver box to a cavity of a ceiling. In some other embodiments, the cavity may not be existed and the assembly light apparatus, including its driver box, is protruding from the installed surface. In addition, such assembly light apparatus may be installed on a surface of a wall or a cavity on a wall. In such case, the ceiling is interpreted as the wall.

The driver box 10 has a box housing 105 for containing a driver circuit for converting external power source to a driving current.

In this example, the driver box 10 has a bottom plate 104, which may be made of metal material for heat dissipation and for rigidity consideration. The box housing 105, on the other hand, may be made of plastic.

Figure 2:
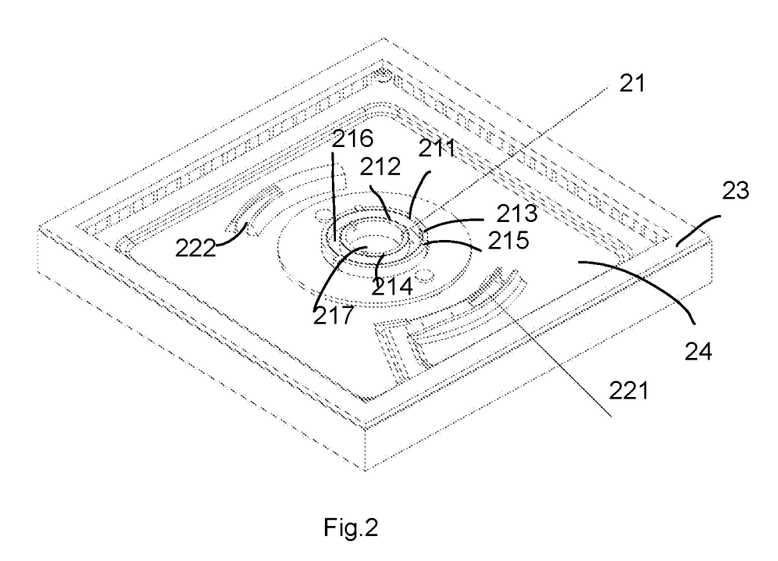
FIG. 2 illustrates a light box embodiment.

Next, please see FIG. 2. FIG. 2 illustrates a light box embodiment.

In FIG. 2, the light box has a circular electrode module 21, a back cover 24, a frame 23, and a light box connector including two groove tracks 221, 222.

The circular electrode module 21 has an outer ring 213 and an inner ring 214. A first electrical terminal 211 is attached to an inner surface of the outer ring 213. A second electrical terminal 212 is attached to an outer surface of the inner ring 214. The outer ring 213 and the inner ring 214 may be made of plastic. In addition, one or more than one fastener structures 215 may be used for fix the first electrical terminal 211 and the second electrical terminal 212 to the outer ring 213 and the inner ring 214.

Figure 3:
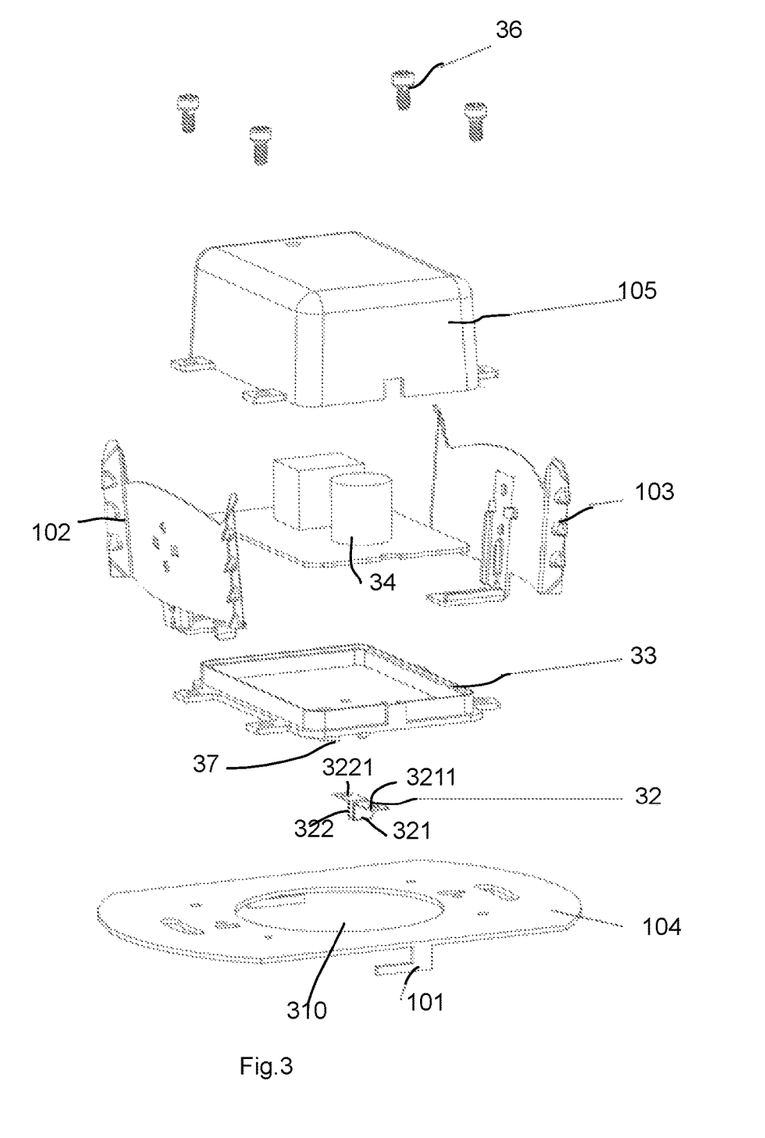
FIG. 3 illustrates an exploded view of a driver box embodiment.

The two groove tracks 221, 222 have tracks to receive L shape structures of a corresponding driver box connector. The inner wall of the inner ring 214 defines an aligning space for storing a circular protruding structure of a corresponding driver box mentioned below to align the driver box and the light box Please see FIG. 3. FIG. 3 illustrates an exploded view of a driver box embodiment.

In FIG. 3, the driver box includes screws 36, a box housing 105, a driver circuit 34, elastic clips 102, 103, a bottom cover 33, a circular protruding structure 37, a first electrode 321, a second electrode 322, a bottom plate 104, a L shape structure 101.

The box housing 105 and the bottom cover 33 forms a box containing the driver circuit 34. In this case, the driver circuit 34 is located on a circuit board facing downwardly. In another embodiment, the circuit board may be inverted to face upwardly to attach to the top of the box housing 105, keeping a distance from the bottom cover 33, which may be closely touching another heat source, e.g. the light box.

The elastic clips 102, 103, as mentioned above, may be replaced with other structures to correspond to different light device standards or installation environment.

The circular protruding structure 37 is designed to be installed to a space defined by an inner wall of a ring electrode module as mentioned in FIG. 2. A more clear illustration is provided in following drawings.

In this example, the first electrode 321 and the second electrode 322 are two L shape metal clips. One ends of the first electrode 321 and the second electrode 322 are aligned in parallel while keeping non-electrically contact. The other ends of the first electrode 321 and the second electrode 322 are extended in opposite directions. There are holes 3211, 3221 on the first electrode 321 and the second electrode 322 so that when metal screws are screwed via the hole to the driver box to reach corresponding electrical terminals, the driving current created by the driver circuit 34 is routed to the first electrode 321 and the second electrode 322.

The bottom plate 104 has two side parts bent as the L shape structure 101 to enter the groove tracks 221, 222 and therefore provide structure connection between the driver box and the light box, by rotation. Please be noted that, in addition to rotation operation, other structures with associated operations like elastic hooks with corresponding holes, may be used as alternative ways to implement the present invention and should be regarded as within the invention scope.

In addition, there is a hole 310 in the middle of the bottom plate 104 so that the first electrode 321, the second electrode 322 and the circular protruding structure 37 may pass through to contact corresponding components on the light box.

Figure 4:
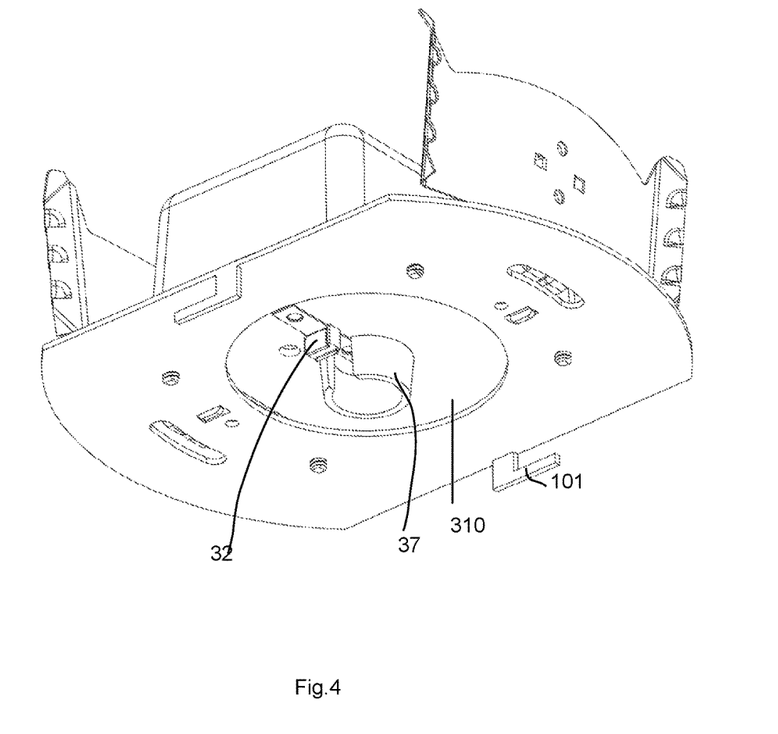
FIG. 4 illustrates the driver box embodiment in another view point.

Please refer to FIG. 4. FIG. 4 illustrates the driver box embodiment in another view point.

In addition to the description provided above, FIG. 4 further shows more clearly for the circular protruding structure 37, driver electrodes 32 of the first electrode and the second electrode, and the L shape structure 10. It can be seen from the FIG. 4 that the driver electrodes 32 are kept a fixed distance from the circular protruding structure 37.

In the following drawings, it is illustrated when the circular protruding structure 37 is entering the corresponding aligning space, the driver electrodes gets closer and then contacts the electrical terminals of the light box.

Figure 5:
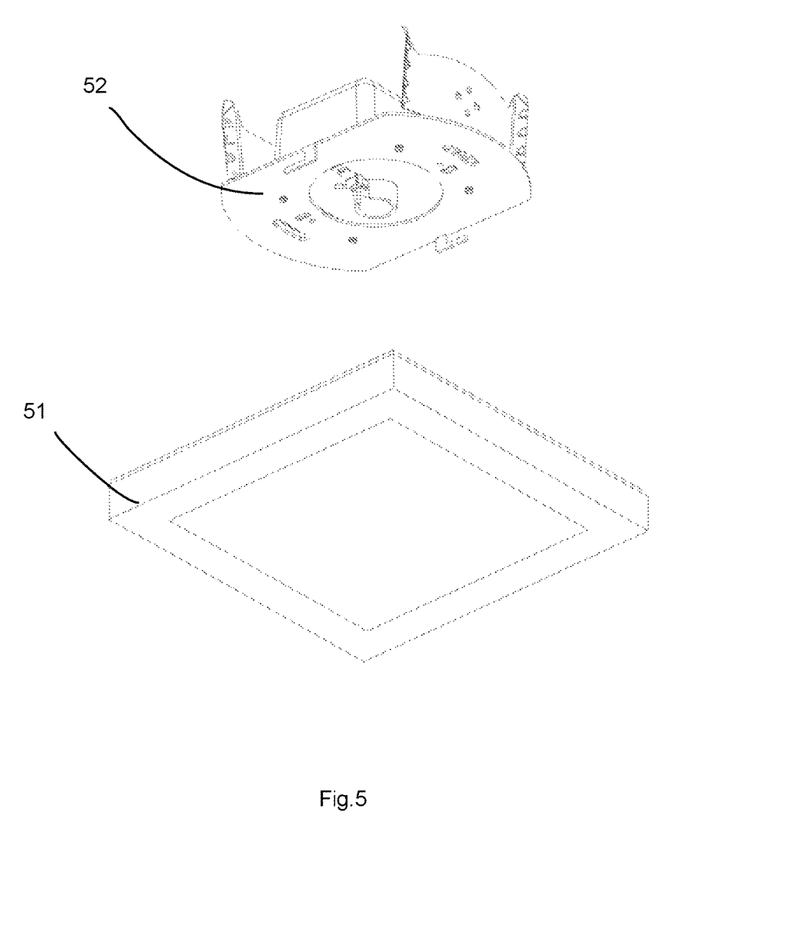
FIG. 5 illustrates a light box and a corresponding driver box.
Figure 6:
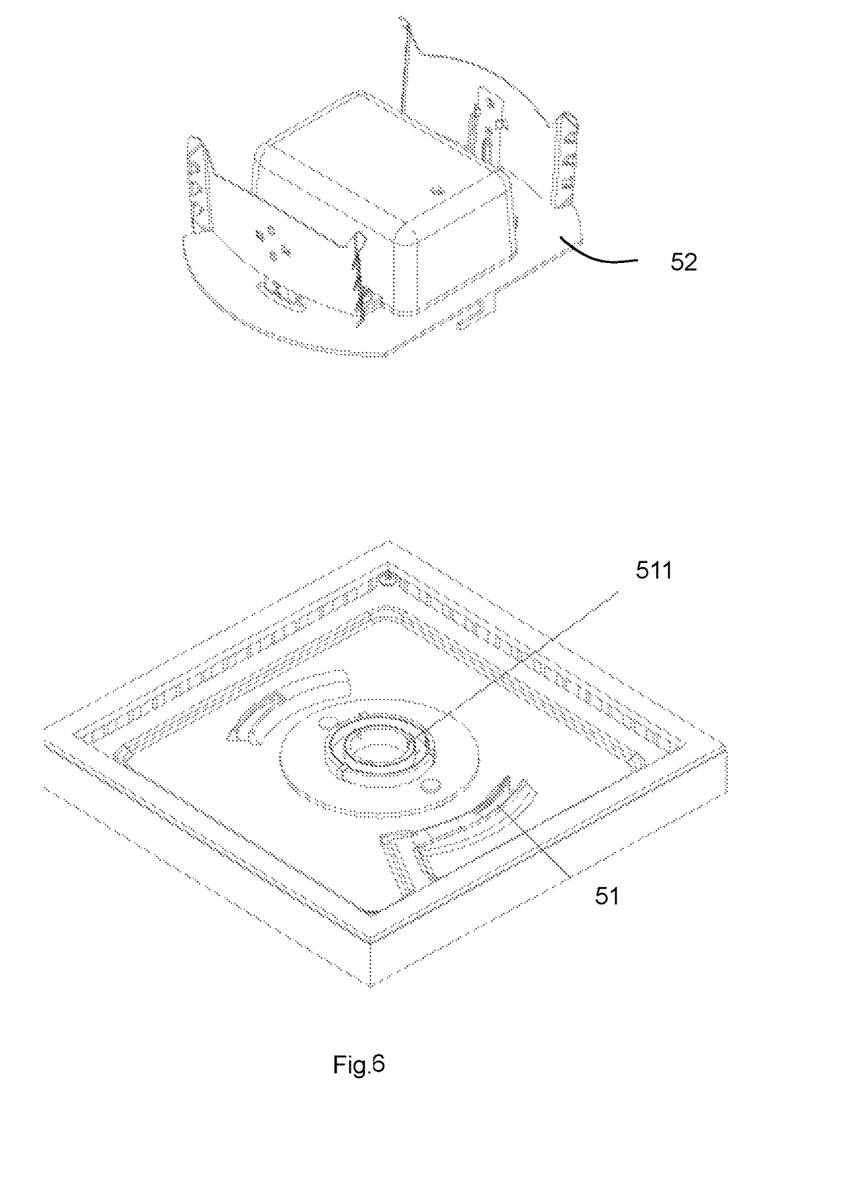
FIG. 6 illustrates another view point of the example of FIG. 5.

Please refer to FIG. 5 and FIG. 6. FIG. 5 illustrates a light box and a corresponding driver box. FIG. 6 illustrates another view point of the example of FIG. 5.

In FIG. 5 and FIG. 6, a light box 51 and the a driver box 52 are prepared and then combined by aligning the circular protruding structure and the circular electrode module 511. The driver box connector is fixed to a corresponding light box connector. In this case, the driver box connector are two L shape structures and the light box connector are two groove tracks.

In other words, there are structure connection and electrical connection between the light box and the driver box.

Figure 7:
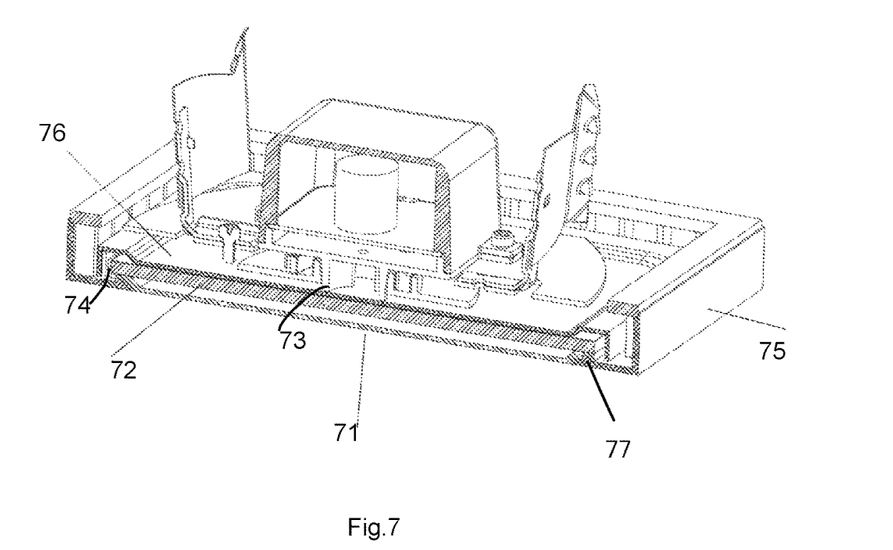
FIG. 7 is a cross-sectional view of an assembly light apparatus embodiment.

FIG. 7 is a cross-sectional view of an assembly light apparatus embodiment.

In FIG. 7, it shows that an output opening 71 covered by a translucent or translucent cover provides light to escape from the assembly light apparatus. The circular protruding structure 73 may be used for aligning and may also be used for structural support and/or heat dissipation. The light box has a back cover 76 made of metal for providing better heat dissipation. The light guide 72 helps change light path direction of the light from the LED module 74 installed on a side wall 75 to the output opening 71.

Ladder structures 77 for components near the output opening helps increase water proof capability.

Figure 8:
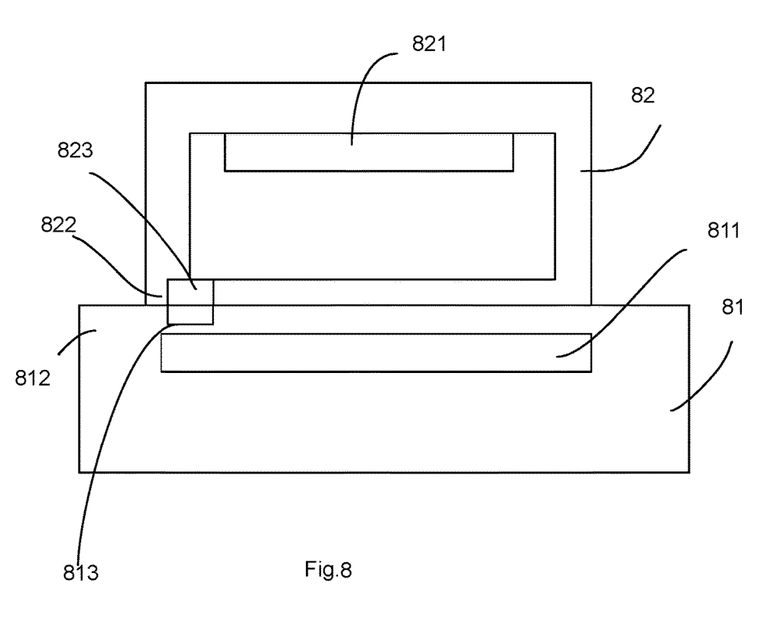
FIG. 8 is a diagram illustrating component relation in an embodiment.

FIG. 8 is a diagram illustrating component relation in an embodiment.

In FIG. 8, a driver box 82 is attached to a light box 81. Since the driver box 82 is designed to be able to detach from the light box 81, another light box 81 may be used to replace the original light box.

The bottom plate 822 of the driver box 82 and the back cover 812 of the light box 81 keep contact in this example. In some other examples, a distance may be kept by some columns for providing air flowing paths for helping further heat dissipation.

In this example, the driver circuit 821 is located on top of the driver box 82 to keep a distance from the contact area with the light box 81, particular when the light source 811 is a major heat source.

Magnetic components 823, 813 are used for helping aligning the connection between the light box 81 and the driver box 82.

Figure 9:
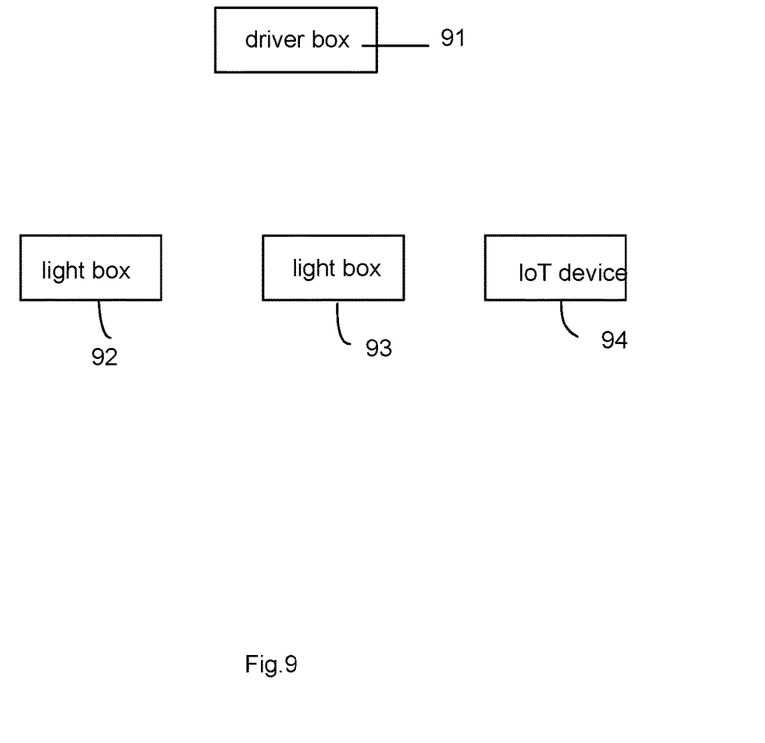
FIG. 9 is a diagram illustrating combination of a driver box to multiple light boxes and other devices.

FIG. 9 is a diagram illustrating combination of a driver box to multiple light boxes and other devices.

The driver box 91 has a driver box connector which may be also integrated with electrical connection capability. The driver box 91 may be connected to different light boxes 92, 93 to provide different light characteristics. Furthermore, non-luminance devices like the IoT (Internet of Things) device 94 may be connected to the driver box 91 to get structure support and electrical supply.

According to an embodiment of the present invention, an assembly light apparatus is designed to be installed in a cavity of a ceiling.

The assembly light apparatus has a LED module, a light box, a driver box, a first electrode, a second electrode, a light box connector, a driver box connector and a fixing structure.

The light box has a containing space for disposing the LED module. The light box has a back cover and a output opening. For example, the light box may be a three-dimension disk shape structure with a sidewall with a side covered by the back cover and the other side has an output opening covered by a transparent or translucent cover. In another example, the light box may have a polygonal shape.

The LED module emits a light that is directly or indirectly escaped outside the assembly light apparatus. For example, the LED module may be placed facing to the output opening. In such case, one or several optical means like reflector, lens or diffusion layer may be placed along light output path. In another example, the LED module is placed at side wall of the light box and a light guide is used for directing light to another angle for outputting form the output opening.

The back cover has a first electrical terminal and a second electrical terminal. For example, the first electrical terminal and the second electrical terminal may be protruding pins or concave sockets on the back cover of the light box.

The driver box contains a driver circuit for converting an external power source to a driving current, e.g. 110-220V alternating current to a direct low-voltage current.

The first electrode and the second electrode are electrically connected to the driver circuit.

The light box connector is fixed on the light box. The driver box connector is fixed on the driver box. The light box connector and the driver box connector have corresponding structures to be detachably connected to each other. When the light box connector and the driver box connector are connected, the light box is fixed to the driver box to keep the first electrical terminal and the second electrical terminal to contact with the first electrode and the second electrode for routing the driving current to the first electrical terminal and the second electrical terminal to drive the LED module to emit the light.

The fixing structure is fixed on the driver box for attaching the driver box to the cavity of the ceiling. In other words, the driver box may be firstly fixed on a ceiling with the fixing structure, e.g. two springs, elastic clips, corresponding to different light fixture standards, e.g. to be installed in an UL box in north America.

In some embodiments, the driver box connector includes a L shape hook. The light box connector includes a groove track. The attachment between the driver box and the light box is performed by sliding the L shape hook into the groove track.

In some embodiments, the assembly light apparatus further includes a stop lock for further locking the L shape hook in a specific position of the groove track. Specifically, an extra force is necessary to move the L shape hook away from the specific position of the groove track. There are various ways to implement such stop lock. For example, an elastic curve groove may be used for holding an end of the L shape hook at the specific position.

In some embodiments, the driver box has a circular protruding structure corresponding to an inner wall of a circular electrode module on the back cover of the light box to align the driver box with respect to the light box.

Specifically, the light box has the circular electrode module with an inner wall facing upwardly and the driver box has the corresponding circular protruding structure facing downwardly. When installed correctly, the circular protruding structure enters and fits in the containing space defined by the inner wall of the circular electrode module.

Please be noted that the circular protruding structure may be disposed on the light box while the circular electrode module is disposed on the driver box as an alternative embodiment.

In some embodiments, furthermore, the first electrode and the second electrode are two metal clips disposed at a relative distance from the circular protruding structure. The circular electrode module has an outer ring and an inner ring. When the circular protruding structure is embedded inside the inner wall of the circular electrode module, the first electrode and the second electrode respectively electrically contact with the first electrical terminal located at an inner surface of the outer ring and an outer surface of the inner ring.

In some embodiments, the outer ring and the inner ring of the circular electrode module are made of plastic material attached with the first electrical terminal and the second electrical terminal respectively. In other words, the outer ring, the inner ring and even the major part of the housing of the light box may be made of insulated material like plastic, which may be less expensive and save certain manufacturing cost.

In some embodiments, the outer ring and the inner ring have fastener structures to fix the first electrical terminal and the second electrical terminal. For example, certain elastic hooks may be placed at top of the outer ring and the inner ring to keep to the first electrical terminal and the second electrical terminal attaching to their side walls.

In some embodiments, the back cover of the light box includes metal material. The back cover is heat conductively connected with the driver box for enhancing heat dissipation. In other words, heat generated from the LED module may be transmitted to the housing of the driver box for enhancing heat dissipation. In some other case where the driver box generates more heat, the heat of the driver box may be delivered to the back cover of the light box, which may be regarded as a heat sink.

In some embodiments, the back cover of the light box is closely attached to the surface of the driver box. In some other embodiments, certain air channels are specifically remained between the driver box and the light box to keep one heat source to interfere with components in another heat source.

In some embodiments, heat is firstly transmitted from the light box to the driver box and then further transmitted to another structure like an UL box via the fixing structure.

In some embodiments, the light box includes a panel light module. Unlike traditional panel light, which has a small thickness light panel attaching on a ceiling facing down, the light box is detachable from the driver box.

The LED module may include multiple LED chips emitting light into a light guide from a lateral wall of the light box and the light guide guides the light from the output opening. The light guide may be made of a plastic plate disposed with multiple light paths and light decoupling grooves, convex or concave structures for light to escape in desired direction and desired pattern.

In some other embodiments, the light box may include a focus lens for converting the light to a light beam at the output opening. For example, the focus lens include one or multiple lens combination. Alternatively, the focus lens may include more than thousands of micro optical lens each respectfully adjusting light paths and form an overall light beam. The term 'light beam' refers to a light output helpful for emphasizing an object projected by the light beam, e.g. with a half-intensity angle of less than 70 degrees or other desired optical effect. Half-intensity angles are standard terms known by persons of ordinary skilled in the art to define optical characteristic, particularly light beam, of a light device.

In some embodiments, since the light box is detachable, another light box with different characteristic may be installed to the same driver box. Specifically, users may buy a assembly light apparatus kit, including multiple light boxes that are replaceable for different purposes.

For example, users may detach a traditional panel light box and attach a colorful holiday light module with the same light box connector to be fixed to a corresponding driver box connector for holiday use. After the holiday, the holiday effect light box, e.g. with colorful filters, may be replaced back to the traditional panel light box.

In some embodiments, the idea may be extended further. Specifically, non-luminance device with the same light box connector as the light box may be designed to replace the light box when necessary by detaching the light box from the driver box and then attaching the non-luminance device to the driver box. For example, a Wi-Fi router, a speaker, a camera, or any other Internet-of-Things devices.

For example, a projector module may be designed to have an interface having the light box connector to be attach to the driver box. The data input of the projector module may be provided wirelessly. The power supply, which may occupy major space, may be now replaced with the driver box. Therefore the projector module may have compact size.

In addition, when the projector module is attached to the driver box, the projector module is located at a perfect position to project images from top to a screen.

In some embodiments, the light box connector is integrated with the first electrical terminal and the second electrical terminal. In other words, both the structural connection and electrical connection are performed by one or two integrated components. For example, electrodes with corresponding wires may be placed on the L-shape structure that is inserted to a corresponding groove track as mentioned above. Corresponding electrodes are also placed on the groove track and when the L-shape structure is placed in the groove track, both structural connection and electrical connection are completed at the same time.

Structures other than L shape structures as mentioned above may be used once they provide both structural and electrical connection between the light box and the driver box.

In some other embodiments, the light box connector is located at a different position from the first electrical terminal and the second electrical terminal. In other words, the structural connection between the light box and the driver box is separate from electrical connection therebetween.

In some embodiments, the first electrode is a L shape chip with a first end for connecting to the first electrical terminal and with a second end for fixing a screw to electrically connect to the driver circuit. For example, the first electrode and the second electrode are two L shape chips with one ends arranged in parallel while the other ends extending to opposite position, e.g. a T shape structure. An insulation material is attached between the two electrodes and two holes are disposed on the other ends of the two electrodes. Metal screws that may be used for establish electricity connection are inserted into the holes and enter into the driver box to contact terminals of the driver circuit, thus routing the driving current from the driver circuit to the first electrode and the second electrode.

In some embodiments, the back cover of the light box and a bottom plate of the driver box is heat conductive connected. For example, the back cover of the light box and a bottom plate of the driver box contact to each other. Heat dissipation glues may even be applied between the light box and the driver box.

In some embodiments, the driver circuit is located on a driver circuit plate away from the bottom plate of the driver box. In other words, the driver circuit is kept a distance not directly close to the light box, to avoid heat accumulation to affect the components of the light box and the driver box.

In some embodiments, a magnetic component may be added for facilitating connection between the light box and the driver box. For example, a magnetic unit and a corresponding unit are placed on the light box and the driver box. When users detach or attach the light box to the driver box, users usually need to stand on a ladder. Magnetic forces may help fix the light box and the driver box more robustly.

Furthermore, the magnetic unit may provide the function of alignment. Users may not need to use their eyes to align the light box with the driver box. The magnetic force helps provide users necessary feedback for users to correctly install the light box to the driver box.

In addition to the above-described embodiments, various modifications may be made, and as long as it is within the spirit of the same invention, the various designs that can be made by those skilled in the art are belong to the scope of the present invention.

The invention claimed is:

1. A lighting apparatus, comprising:
a LED module;
a light box for disposing the LED module, the light box comprising a back cover and a output opening for a light emitted from the LED module to escape outside the assembly light apparatus, the back cover having a first electrical terminal and a second electrical terminal;
a driver box for containing a driver circuit for converting an external power source to a driving current;
a first electrode electrically connected to the driver circuit;
a second electrode electrically connected to the driver circuit;
a light box connector fixed on the light box;
a driver box connector fixed on the driver box corresponding to the driver box connector for detachably attaching to the light box connector for fixing the light box to the driver box to keep the first electrical terminal and the second electrical terminal to contact with the first electrode and the second electrode for routing the driving current to the first electrical terminal and the second electrical terminal to drive the LED module to emit the light;
a communication IoT (Internet of Things) device stored in the driver box for receiving a command from an external device, the driver circuit generating the driving current according to the command;
a fixing structure fixed on the driver box for attaching the driver box to the cavity of the ceiling, wherein the driver box connector comprises a L shape hook, the light box connector comprises a groove track, the attachment between the driver box and the light box is performed by sliding the L shape hook into the groove track; and
a stop lock for further locking the L shape hook in a specific position of the groove track, an extra force being necessary to move the L shape hook away from the specific position of the groove track;
wherein the driver box has a circular protruding structure corresponding to an inner wall of a circular electrode module on the back cover of the light box to align the driver box with respect to the light box;
wherein the first electrode and the second electrode are two metal clips disposed at a relative distance from the circular protruding structure, the circular electrode module has an outer ring and an inner ring, when the circular protruding structure is embedded inside the inner wall of the circular electrode module, the first electrode and the second electrode respectively electrically contact with the first electrical terminal located at an inner surface of the outer ring and the second electrical terminal located at an outer surface of the inner ring.

2. The lighting apparatus of claim 1, wherein the outer ring and the inner ring of the circular electrode module are made of plastic material attached with the first electrical terminal and the second electrical terminal respectively.

3. The lighting apparatus of claim 2, wherein the outer ring and the inner ring have fastener structures to fix the first electrical terminal and the second electrical terminal.

4. The lighting apparatus of claim 3, wherein the back cover of the light box comprises metal material, the back cover is heat conductively connected with the driver box for enhancing heat dissipation.

5. The lighting apparatus of claim 4, wherein heat of the light box is further indirectly dissipated via the fixing structure.

6. The lighting apparatus of claim 1, wherein the light box comprises a panel light module, the LED module comprises multiple LED chips emitting light into a light guide from a lateral wall of the light box and the light guide guides the light from the output opening.

7. The lighting apparatus of claim 1, wherein the light box comprises a focus lens for converting the light to a light beam at the output opening.

8. The lighting apparatus of claim 1, further comprising a second light box with the same light box connector as the light box to replace the light box when necessary by detaching the light box from the driver box and then attaching the second light box to the driver box.

9. The lighting apparatus of claim 1, further comprising an non-luminance device with the same light box connector as the light box to replace the light box when necessary by detaching the light box from the driver box and then attaching the non-luminance device to the driver box.

10. The lighting apparatus of claim 1, wherein the light box connector is integrated with the first electrical terminal and the second electrical terminal.

11. The lighting apparatus of claim 1, wherein the light box connector is located at a different position from the first electrical terminal and the second electrical terminal.

12. The lighting apparatus of claim 1, wherein the first electrode is a L shape chip with a first end for connecting to the first electrical terminal and with a second end for fixing a screw to electrically connect to the driver circuit.

13. The lighting apparatus of claim 1, wherein the back cover of the light box and a bottom plate of the driver box is heat conductive connected.

14. The lighting apparatus of claim 13, wherein the driver circuit is located on a driver circuit plate away from the bottom plate of the driver box.

15. The lighting apparatus of claim 1, further comprising a magnetic component for facilitating connection between the light box and the driver box.

16. The lighting apparatus of claim 15, the magnetic component facilitates alignment between the light box and the driver box.

* * * * *